April 20, 1954 E. H. HUGENHOLTZ ET AL 2,676,263

IMPULSE GENERATOR

Filed Dec. 6, 1947

INVENTORS.
EDUARD H. HUGENHOLTZ
JOHANNES HOOGENDOORN
BY Fred M Vogel
AGENT

Patented Apr. 20, 1954 2,676,263

UNITED STATES PATENT OFFICE 2,676,263

IMPULSE GENERATOR

Eduard Herman Hugenholtz and Johannes Hoogendoorn, Eindhoven, Netherlands, assignors to Hartford National Bank and Trust Company, Hartford, Conn., as trustee Application December 6, 1947, Serial No. 790,142
In the Netherlands September 16, 1946

Section 1, Public Law 690, August 8, 1946
Patent expires September 16, 1966

8 Claims. (Cl. 250—36)

If an impulse generator is required to be used for controlling the frequency of a transmitter, it is naturally necessary for the frequency of the impulse generator itself to be kept within the narrowest possible limits. For this purpose use will preferably be made of a quartz crystal.

This is possible, for example, by placing such a crystal in parallel with the frequency-determining circuit of a tube in the so-called transitron circuit-arrangement. This, however, sometimes gives rise to the undesirable phenomenon that the frequency tends to jump back and forth between the two values that are determined by the crystal and the said circuit (comprising if necessary, a single coil having a stray capacity) respectively.

The invention has for its object to provide a crystal-controlled impulse generator, in which the disadvantage just referred to cannot occur.

According to the invention, use is made for this purpose of the combination of an oscillator circuit-arrangement controlled by a crystal only and a so-called blocking oscillator.

One form of crystal oscillator highly suitable for this purpose is the so-called Pierce circuit-arrangement which is to be understood to mean a generator tube comprising a crystal connected between cathode and control-grid, a circuit connected between anode and cathode and substantially tuned to the crystal frequency and in addition a coupling condenser between anode and control-grid.

Figure 1:
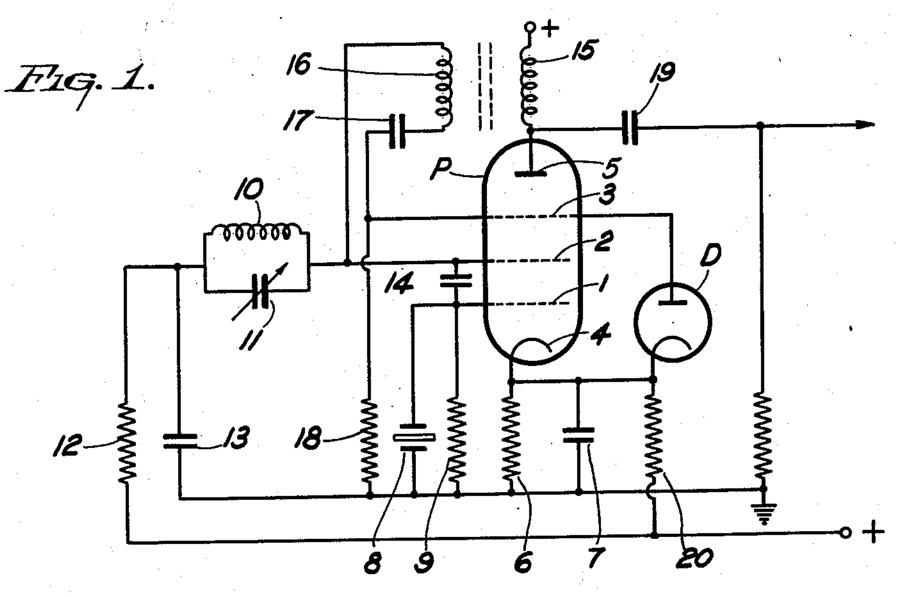

In order that the invention may be more clearly understood and readily carried into effect, it will now be described more fully with reference to the accompanying drawing, in which Fig. 1 shows a circuit-arrangement of the said kind which, however, according to the invention, is combined with a blocking oscillator. For this purpose use is made of a multi-grid tube.

The tube used according to Fig. 1 is a pentode P comprising grids 1, 2 and 3 between a cathode 4 and an anode 5. Only a tube comprising the minimum number of crystal grids required is shown for the sake of clearness of illustration. As an alternative, however, excellent results are obtainable with a heptode or pentagrid, in which the (screen) grid 2 is constructed so as to be double on either side of the grid 3 and in which provision is made in addition of a fifth grid (suppressor grid) between anode and screen grid.

The cathode 4 is earthed through a resistance 6 and a parallel condenser 7, whilst the grid 1 is also connected to earth through a crystal 8 and its leak resistance 9.

The grid 2 acting as an anode is connected through a circuit comprising a coil 10 and a tuning condenser 11 and through a resistance 12 and its smoothing condenser 13, to the positive terminal of the anode voltage source. In addition, this grid is coupled through a condenser 14 to the grid 1.

The circuit-arrangement hitherto described, known as the Pierce circuit-arrangement, permits of producing oscillations having a substantially constant frequency; the grids 1 and 2 oscillate in phase opposition and during the negative voltage periods of the grid 1 the tube is blocked.

In addition, the anode circuit comprises a coil 15 which is tuned to a considerably higher frequency than the crystal 8, for example from 1 to 2 mc./s. This coil is coupled to a coil 16, one end of which is connected to the grid 2 and the other end through a blocking condenser 17 to the grid 3 which is earthed through a leak resistance 18. The coil 16 may also, or else instead of coil 15 be tuned to the high frequencies.

This arrangement, to which the known principle of the blocking condenser is applied, enables the system to oscillate periodically during only one period of the high natural frequency of the coil 15 and/or 16 and for the rest periodically remains blocked due to the negative potential of the grid 3. There are two causes for the latter fact: firstly the grid 3 is charged to a high negative value by grid current at each current pulse passing through the tube and secondly, owing thereto the potential of the grid 2 decreases due to increase of the (screen) grid current, said decrease resulting, due to induction, in a further decrease of the potential of the grid 3 and so forth (transitron effect).

Consequently, at each passage of current through the tube, which, since the tube operates in class-C arrangement and thus becomes conductive during a fraction only of each period of the crystal frequency, has the pattern of a current pulse, a highly damped oscillation of very high frequency occurs in the coils 15 and 16. This would occur each time when the potential of the grid 1 passes through zero, and hence twice in each period of the crystal frequency. In order to avoid this frequency-doubling, provisions may be taken for the grid 3 to remain blocked every other time by a proper choice of the time constant of the system 17, 18 and, in addition, by a small phase-displacement by the coil 10.

Figure 2:
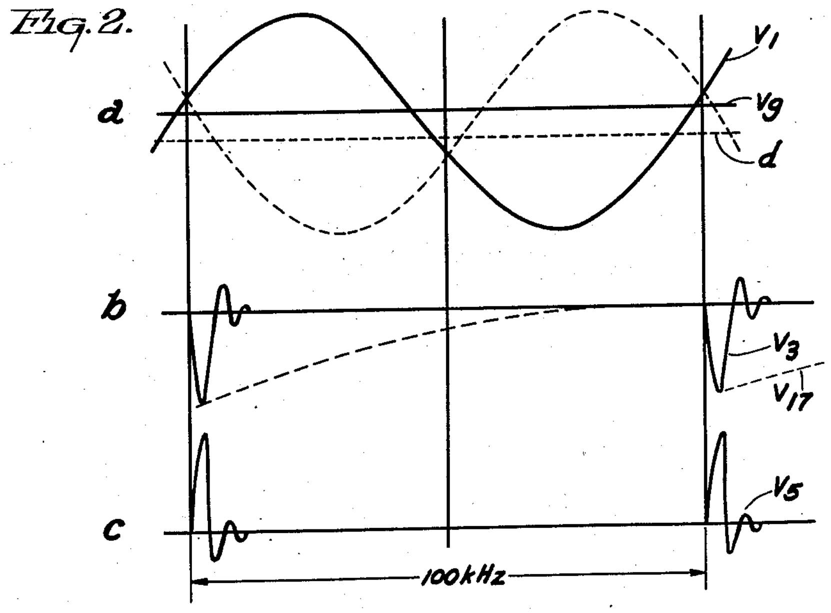

This may be explained more fully with reference to Fig. 2 in which at *a* the variations of the voltages $v_1$ and $v_2$ across the grids 1 and 2 respectively during a whole period of the crystal oscillation is illustrated and in which at *b* and *c* the simultaneous variations of the impulses $v_3$ and $v_5$ respectively set up across the grid 3 and the anode 5 respectively are shown.

Apart from a deliberately applied small phase displacement the two curves $v_1$ and $v_2$ are in phase opposition. This will allow current to pass between the grids 1 and 2 at the first passage of the voltage through zero but not at the second passage through zero, since in the latter case the value of $v_1$ is below the cut-off value, which is indicated by the horizontal dotted line *d*.

As soon as the tube has become conductive, its top part starts to operate as a periodically interrupted (blocking) oscillator, the grid 3 being charged during the first half-period of this oscillation to such a negative value that there is no further oscillation. Thus, the circuit will oscillate out in a greatly damped manner, as is shown in Fig. 2*b*. Finally, Fig. 2*c* shows the variation of the impulses in the coil 15, which, being positive, are adapted to be fed directly through a condenser 19 to a load, for example a tube in C-arrangement.

The time constant of the system 17, 18 is required to be such that on the one hand the condenser 17 is discharged within one period of the crystal (the frequency of which is, for example, 100 kc./s.) to such an extent as to allow the oscillation to start again, but that on the other hand after a half period the grid 3 still exhibits sufficient negative charge to keep this grid blocked, if the above mentioned phase displacement between the voltages at the grids 1 and 2 should be insufficient to suppress any second impulse. The desired variation of the condenser voltage is shown in Fig. 2*b* in dotted lines by the curves $v_{17}$.

Finally, it may be desirable for a diode D to be connected between the grid 3 and the cathode 4, since otherwise passage of the grid current towards this grid might be prevented by the grid 1. The cathodes of the tubes P and D are directly interconnected and connected through a resistance 20 to the positive terminal of the anode battery, so that an adequate amount of negative bias voltage is safeguarded under all conditions by voltage drop across the resistance 6.

What we claim is:

1. An impulse generator comprising an electron discharge device provided with a cathode, a first grid, a second grid and a plate electrode, a crystal-controlled oscillatory circuit operating at a predetermined frequency and including an electron discharge system constituted by the cathode, the first grid and the second grid of said device and a piezo-electric crystal member coupled between said first grid and one of the other electrodes of said system, said first grid acting as a control grid in said system and said second acting as an anode in said system, a resonator element tuned to a frequency which is high relative to said predetermined frequency, means to apply a constant potential through said resonator element to said plate, means coupled to said resonator element to derive a blocking voltage from said element each time after one oscillatory period thereof, and means to apply said blocking voltage to an electrode of said device to render same non-conductive, whereby impulses are yielded at said plate at a repetition rate corresponding to said predetermined frequency.

2. An impulse generator comprising an electron discharge device provided with a cathode, a first grid, a second grid and a plate electrode, a crystal controlled oscillatory circuit operating at a predetermined frequency and including an electron discharge system constituted by the cathode, the first grid and the second grid of said device, said first grid acting as a control grid and said second grid acting as an anode, a piezo-electric crystal member connected between the cathode and the control grid of said system, a tuned network connected between the cathode and the anode of said system and a feedback capacitor connected between the anode and the control grid of said system, a resonator element tuned to a frequency which is high relative to said predetermined frequency, means to apply a positive potential through said resonator element to said plate, means coupled to said element to derive a blocking voltage from said element each time after one oscillatory period thereof, and means to apply said blocking voltage to an electrode of said device to render same non-conductive, whereby impulses are yielded at said plate at a repetition rate corresponding to said predetermined frequency.

3. A periodic impulse generator comprising an electron discharge device provided with a cathode, first, second and third grids and a plate electrode, a crystal-controlled oscillatory circuit operating at a predetermined frequency and including an electron discharge system constituted by the cathode, the first grid and the second grid of said device and a piezo-electric crystal member coupled between said cathode and said first grid of said system, said first grid acting as a control grid in said system and said second grid acting as an anode in said system, a resonator element tuned to a frequency which is high relative to said predetermined frequency, means to apply a positive voltage through said resonator element to said plate, means coupled to said resonator element to derive a blocking voltage from said element each time after one oscillatory period thereof, and means to apply said blocking voltage to said third grid to render said device non-conductive whereby impulses are yielded by said plate at a repetition rate corresponding to said predetermined frequency.

4. A periodic impulse generator comprising an electron discharge device provided with a cathode, first, second and third grids and a plate, in the order named, a crystal controlled oscillatory circuit operating at a predetermined frequency, said circuit including an electron discharge system constituted by said cathode, said first grid acting as a control grid and said second grid acting as an anode, a piezo-electric crystal member connected between said cathode and said control grid, a tuned network connected between said cathode and said anode and a feedback capacitance connected between said anode and said control grid, a resonator element and tuned to a frequency which is high relative to said predetermined frequency, means to apply a positive potential through said resonator element to said plate, means coupled to said element to derive a blocking voltage from said element each time after one oscillatory period thereof, and means to apply said locking voltage to said third grid to render said device non-conductive whereby impulses are yielded by said plate at a repetition rate corresponding to said predetermined frequency.

5. An arrangement as set forth in claim 4, wherein said tuned network in said oscillatory circuit is arranged to effect a phase displacement between the oscillatory voltages appearing on said control grid and on said anode to an extent at which current flows through said discharge path in said device only once during each period of said predetermined frequency.

6. An arrangement as set forth in claim 4, wherein said means to derive a blocking voltage from said element comprises a coil inductively coupled to said element, a blocking condenser connected in series with said coil between said third grid and said anode, and a resistance connected between said third grid and said cathode, said blocking voltage being developed across said resistance.

7. An arrangement as set forth in claim 6 wherein the time constant of the resistance-capacitance network formed by said blocking condenser and said resistance has a value at which the blocking voltage developed across said resistance is erased in an interval falling between a half period and a full period of said predetermined frequency of said oscillatory circuit.

8. An arrangement as set forth in claim 7 further including a diode electron discharge device connected between said cathode and said third grid.

References Cited in the file of this patent

UNITED STATES PATENTS

| Number | Name | Date |
|---|---|---|
| 1,919,795 | Marrison | July 25, 1933 |
| 2,212,202 | Faudell et al. | Aug. 20, 1940 |
| 2,215,776 | Barnard | Sept. 24, 1940 |
| 2,217,401 | Geiger | Oct. 8, 1940 |
| 2,230,097 | Whitaker | Jan. 28, 1941 |
| 2,373,223 | Braaten | Apr. 10, 1945 |
| 2,452,951 | Norgaard | Nov. 2, 1948 |
| 2,484,763 | Sturm | Oct. 11, 1949 |
| 2,540,524 | Houghton | Feb. 6, 1951 |

FOREIGN PATENTS

| Number | Country | Date |
|---|---|---|
| 210,447 | Switzerland | July 15, 1940 |

OTHER REFERENCES

Kirkman, 527,321, filed March 20, 1944, published January 3, 1950, as abandoned application. (Abstracted in volume 630, O. G., page 282.)